(12) United States Patent
Barziza

(10) Patent No.: US 6,717,727 B2
(45) Date of Patent: Apr. 6, 2004

(54) UNIVERSAL CAMERA MOUNTING ADAPTER AND METHOD

(76) Inventor: Samuel W. Barziza, 1 Robin Hood La., Conroe, TX (US) 77301

( * ) Notice: Subject to any disclaimer, the term of this patent is extended or adjusted under 35 U.S.C. 154(b) by 0 days.

(21) Appl. No.: 09/683,812

(22) Filed: Feb. 19, 2002

(65) Prior Publication Data

US 2002/0114070 A1 Aug. 22, 2002

Related U.S. Application Data

(60) Provisional application No. 60/269,391, filed on Feb. 16, 2001.

(51) Int. Cl.[7] .............................................. G02B 23/00
(52) U.S. Cl. ...................... 359/399; 359/363; 359/406; 359/408
(58) Field of Search ................................ 359/363, 367, 359/369, 399–408, 409, 896, 808–818, 430; 396/428–434; 348/73, 75

(56) References Cited

U.S. PATENT DOCUMENTS

| 2,990,759 | A | * | 7/1961 | Marcosky | 396/324 |
| 3,589,260 | A | * | 6/1971 | Ferra | 396/419 |
| 4,578,708 | A | * | 3/1986 | Munnion | 348/375 |
| 5,053,794 | A | * | 10/1991 | Benz | 396/432 |
| 5,625,851 | A | * | 4/1997 | Boxer | 396/341 |
| 6,019,326 | A | * | 2/2000 | Baerwolf et al. | 248/177.1 |
| 6,357,937 | B1 | * | 3/2002 | Stratton, Jr. | 396/428 |

* cited by examiner

Primary Examiner—Thong Q. Nguyen
(74) Attorney, Agent, or Firm—Lundeen & Dickinson, LLP.; David B. Dickinson; H. Lee Huddleston, Jr.

(57) ABSTRACT

The present invention relates to a mounting system for mounting a camera, or other similar devices, for afocal photographic viewing through a telescope eyepiece providing an attachment for the telescope which allows attachment of the telescope eyepiece and a yoke which locks and supports a supporting rail along which is mounted a camera platform which is designed to be adjustable to bring the camera or other light receptor device into axial alignment with the eyepiece of the telescope quickly and to hold the device in fixed axial alignment. The invention permits adjustment with four aspects: lateral perpendicular mutually exclusive movement in two axes to the optical axis; longitudinal movement along the optical axis; and tilting or pivoting movement in one of the two lateral perpendicular axes.

19 Claims, 9 Drawing Sheets

UNIVERSAL CAMERA MOUNTING ADAPTER AND METHOD

CROSS REFERENCE TO RELATED APPLICATIONS

The present application claims the benefit of priority to Provisional Application 60/269,391, filed herein on Feb. 16, 2001.

BACKGROUND OF INVENTION

The present invention relates to an adapter for mounting a camera or the like on a telescope for afocal photography; more specifically, to a universal camera mounting apparatus that provides for flexible adjustment of the camera on a pivoting and sliding mounting mechanism, which may be fixed in a given position for long exposures required from telescopic photography.

A number of mounting devices for photographic equipment can be found in the prior art. Many of these prior art devices involved attaching fixed tubes screwably attached to the lens system or eyepiece of the telescope and providing a camera mount on the distal end of the tube for attachment of the camera. Other devices provided brackets which were mounted on the telescope which provided extensible arms for mounting a camera or videocamera to the bracket. These bracket were not readily aligned along the optical axis of the telescope and did not permit easy adjustment of the camera once attached to the bracket. None of the prior art devices offer the degrees of freedom to the mounting and adjustment offered by the universal camera mounting adapter of the present invention.

SUMMARY OF THE INVENTION

A camera, which may be either single lens reflex or video camera, or charge coupled device (CCD) camera, may be affixed in front of the eyepiece of a telescope such as a Schmidt-Cassegrain telescope (SCT) using the apparatus herein described. A rear cell adapter is threaded onto the telescope. Into this rear cell adapter, the regular viewing lens for the telescope is removably attached. Affixed to the rear cell adapter is yoke assembly that provides means for securing the yoke against the rear cell adapter. The yoke also provides a profile parallel to the axis of the the telescope. Into this profile a generally square rail formed from aluminum is attached and held in the profile with set screws. Attached to this rail is the camera base platform assembly that provides a similar profile to fit the generally square rail on the distal end of the rail. The camera base assembly is likewise provided with set screws which permit it to be moved from the distal end of the rail to any point along the square rail.

An attaching plate is affixed to the base of the camera and mates with the top of the camera base platform assembly. The attaching plate is grooved along one side to allow the camera to be moved laterally once attached to the platform. When the lens of the camera is aligned with the eyepiece on the telescope, another set screw may be engaged to hold the camera in a fixed position for the commencement of the photographic session.

Once the camera is attached and aligned with the eyepiece on the telescope, the lens of the camera and the lens on the telescope are covered with a plasticized hood with provides resilient members along its edge to fit snuggly over the two lens to prevent ambient light from reaching the camera lens other than light which comes through the telescope lens.

DETAILED DESCRIPTION

Figure 1:
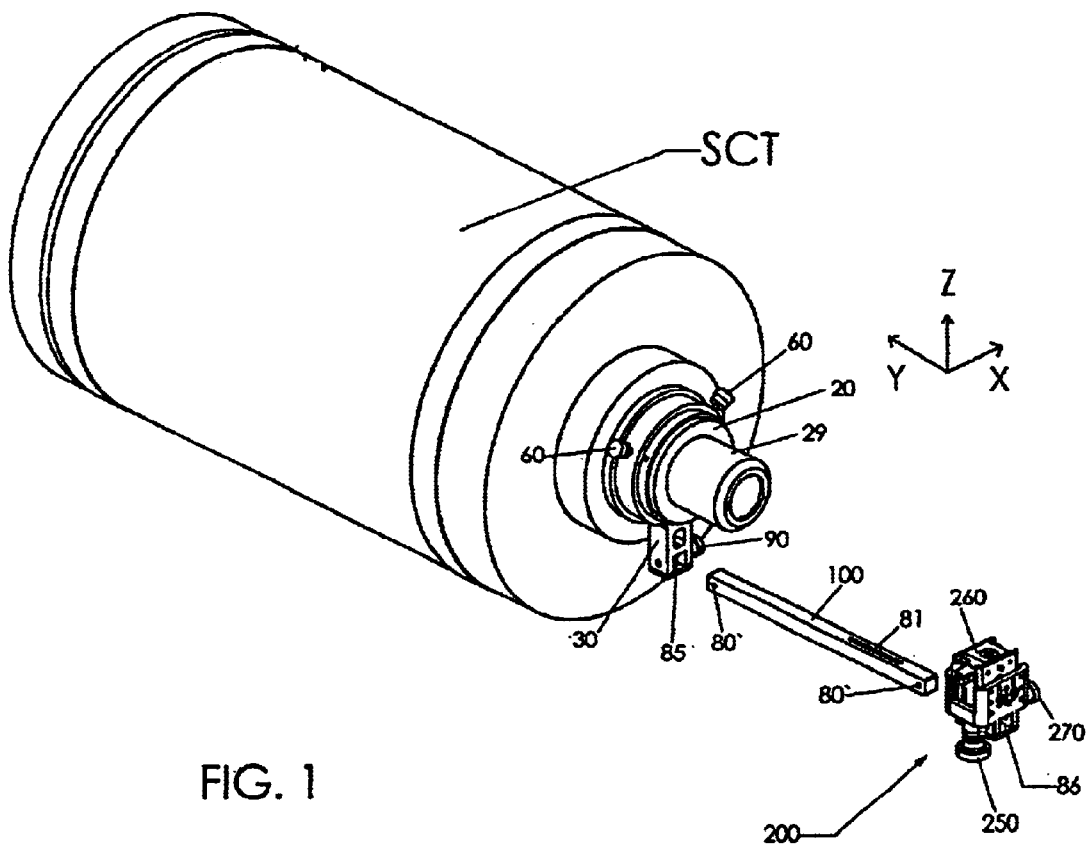
FIG. 1 is a perspective diassembled drawing of the universal camera adapter assembly shown providing a mount to a telescope.

As previously noted, the applicant is unaware of any camera mounting device which permits afocal photography without significant adjustment and preparation of the mounting system. All other devices known to applicant are specific to a particular camera or mounting device and cannot be used for more than one type or style of camera. Directing our attention to FIG. 1, any single lens reflex camera, videocamera, or CCD, including digital cameras, may be connected to the universal camera platform 200. The universal camera platform is slideably engaged to a rail 100 which is slideably engaged in a yoke 30 which depends from a rear cell adapter 20 which is threaded on the rear plate of the telescope, for example as shown a Schmidt Cassegrain telescope SCT. It should be readily understood that the present apparatus might be also attached to other types of telescopes that permit the threaded attachment of the rear cell adapter 20. A single lens reflex camera, such a 35 mm Nikon F camera, may be used, but it may be readily appreciated that any model of camera, videocamera, or CCD device could be mounted on the platform 200 by attaching the device to the camera plate adapter 260. The camera plate adapter 260 is mounted on the camera in a universally available screw mounting provided on all cameras and the adapter is aligned to be flush with the lower front edge of the camera to align the groove or slot 261 which is cut in the front face of the adapter plate 260 with the focal plane of the camera or other device. This assures that the camera will align with the eyepiece of the telescope when moved into axial alignment.

Figure 7:
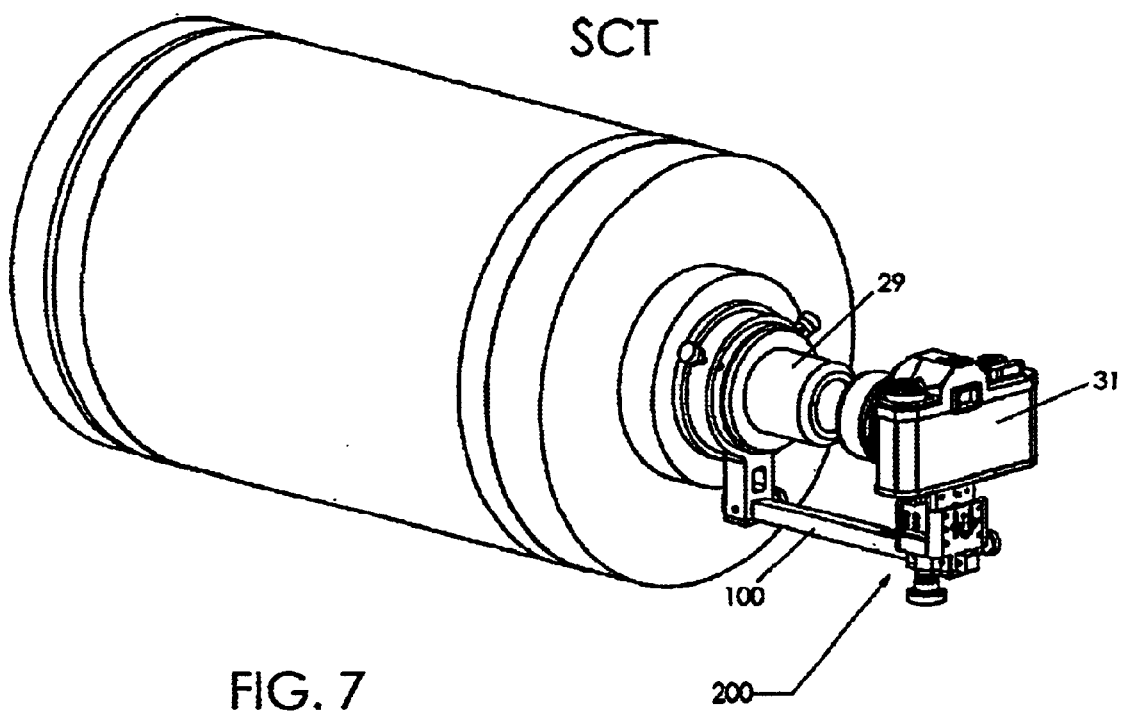
FIG. 7 is a rear posterior view of the assembled universal camera mounting adapter with camera and SCT.
Figure 8:
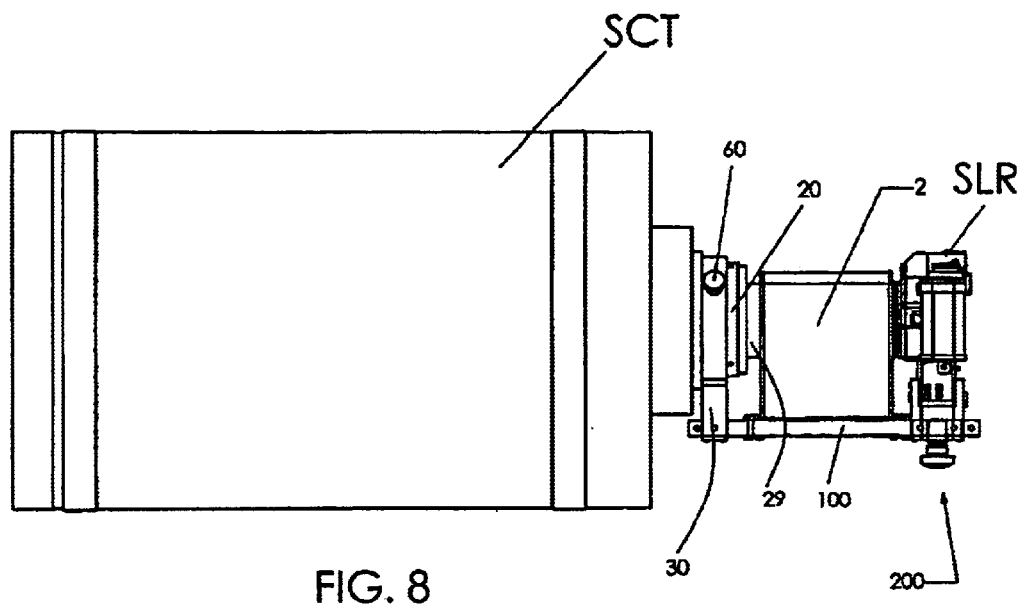
FIG. 8 is a left side plan view of the assembled universal camera mounting adapter with camera (SLR), hood, and SCT.
Figure 10:
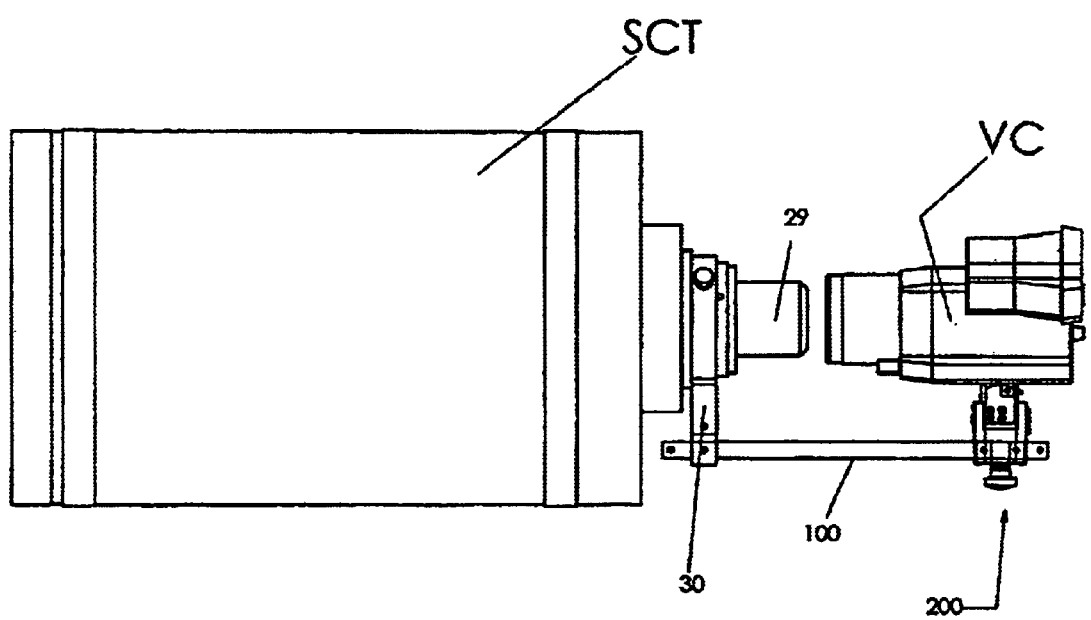
FIG. 10 is a left side plan view of the assembled universal camera mounting adapter with videocamera and SCT, but without the hood.

The camera, shown both as element 31 in the FIG. 7 and SLR in FIG. 8, and the videocamera VC as shown in FIG. 10, for example, may be provided with a readily available camera lens such as a 28 mm lens normally sold with such cameras. No special lenses are required to use the present device that adapts to the optical system inherent in the telescope lens and the camera lens.

Referring initiall to FIG. 1, rear cell adapter 20 is screwed into the end of the telescope SCT and provides interior throat to receive a standard telescope eyepiece 29, including, but not limited to, 55 mm Plossl eyepiece offered by Televue, a retailer of lens systems for telescopes. The yoke 30 is fitted around the rear cell adapter and secured to the adapter by manual set screws 60. A generally square rail 100 is inserted in the longitudinal groove 85 formed on the outer edge of the yoke assembly 30. The generally square profile of the groove mates with the square rail 100 to form a snug fit which inhibits twisting motion of the rail/platform system in use. The square rail 100 is fixed in the groove by manually set compression screw 90 that compressively engages in the profile 85 and holds the rail to prevent movement in the yoke assembly 30. As may be further appreciated from FIG. 1, rail 100 is provided with a groove or slot 81 at its distal end to permit access to the ball set screw mechanism of the platform to adjust the angle or tilt of the platform after mounting the camera or other device. The rail 100 may also provided with set screws and holes at 80 and 80' which would be inserted to prevent the rail from being accidentally moved out of the grooves 85 or 86, thus preventing the accidental removal of the camera platform 200 from the rail 100, or the rail 100 from the yoke 85 during set up and adjustment. Set screw 80 may be used to lock the rail 100 into the yoke at hole adjacent the SCT yoke plate and set screw 80' may be used to lock the rail 100 into the camera platform to prevent the movement of the camera platform relative to the rail while the operator's attention may be focused on viewing through the lens to set up the camera. Rail 100 is sufficiently strong to prevent any torque or twisting of the camera base in operation.

Figure 2:
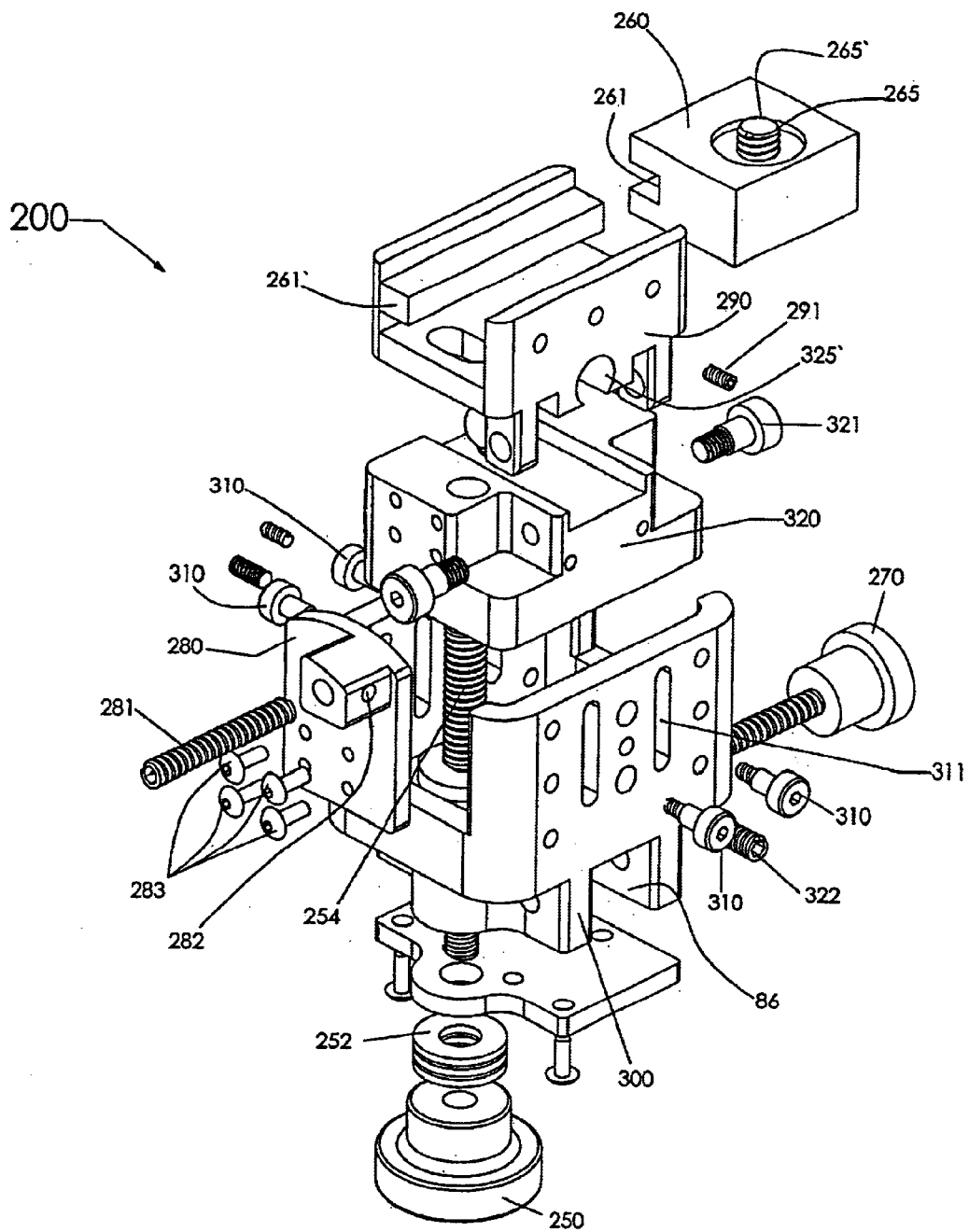
FIG. 2 is closer left posterior exploded view of the attachment plate and universal camera mounting platform.

The operation of the apparatus of the present invention may best be understood by viewing the cooperation of the parts of the platform 200 as more fully shown in a disassembled form in FIG. 2. FIG. 2 is a left posterior exploded view of the platform 200. Camera adapter plate 260 is attached to the camera or other device with threaded bolt 265' and then inserted from the opposite face into a groove 261. This adapter plate permits movement within the groove 261, which engages lip or T-edge 261', to permit axial alignment of the camera with the longitudinal axis of the SCT. This slideable engagement permits the user to align the camera shutter with the eyepiece of the telescope along what may be described as the x-axis as shown in FIG. 1. Once aligned the camera platform, with the adapter plate attached, may be locked by set screw 291 in any of the threaded holes on the back face 290 of the carrier.

Figure 9:
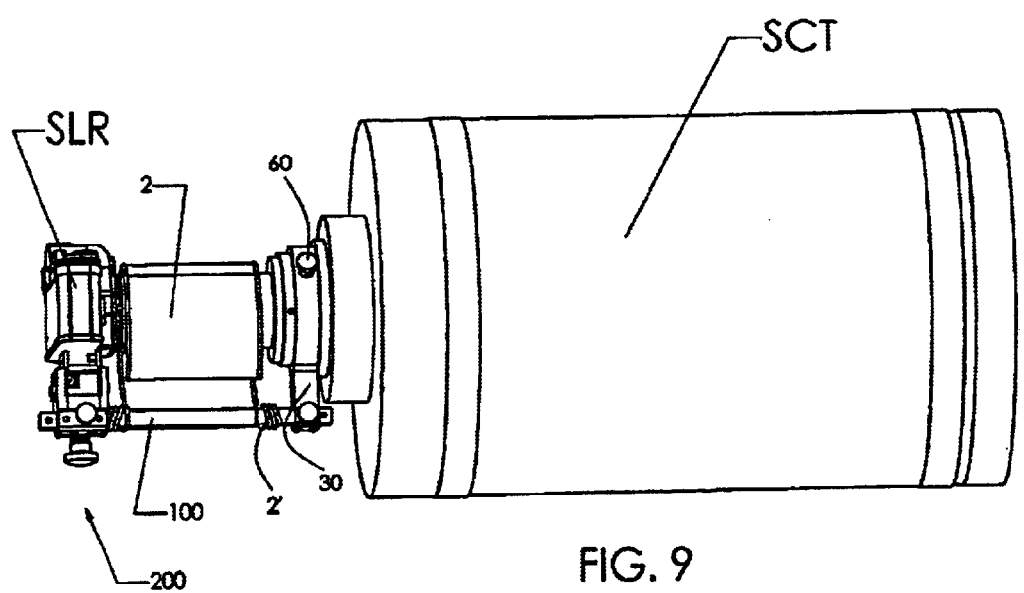
FIG. 9 is a right side plan view of the assembled universal camera mounting adapter with camera (SLR), hood, and SCT.

The camera 31 (as shown in FIGS. 7–9, for example) or the videocamera VC shown in FIG. 10, and adapter plate 260 are then engaged in the platform 200 which is in turn attached to the rail 100 supported by the yoke 30 and rear cell adapter 20 which are mounted around the lens 29 on the telescope. The yoke 30 is held to the rear cell adapter 20 by manually engaged set screws 60 and the rail is held fast by manually engaged set screws 90. Upon alignment of the camera lens with the telescope lens 29, as noted in FIG. 2, set screw 270 is tightened to hold the platform 200 set on rail 100. The movement of the camera platform 200 on the rail 100 may be described as movement along the y-axis in the context of FIG. 1.

Knob 250, which connects to platform carrier 320 by the engagement of screw 254, may be used to selectively move the camera in a plane perpendicular to the longitudinal axis (or optical axis) of the telescope, which therefore may best be described as the z-axis of this system as described in FIG. 1. As may be readily appreciated, the camera may be adjusted forwards and backwards along the rail 100, and may be adjusted side to side along the slot or groove on the adapter plate 260, and moreover, the plane of the camera may be adjusted by the movement of the adapter plate in the platform with knob 250.

Further, as shown in FIG. 2, once the camera lens is axially aligned with the telescope eyepiece, stop screw 281 may then be moved into engagement with camera adapter 260 to fix the point of alignment. A set screw in bore 282 is then set to engage the stop screw and maintain it at the appropriate setting for the camera to permit removal without disturbing the settings. Set screws 291 are engaged in set screw holes on the back face of platform 290 to rigidly hold the camera adapter 260 against the T-edge 261'. Set screws are disengaged to permit the camera to be removed from the platform 200 without changing any of the settings for alignment purposes. It is expected that once all of the adjustments are made for a particular camera and lens combination, little or no time will be required by the operator to assemble and disassemble the camera and telescope together.

Figure 2A:
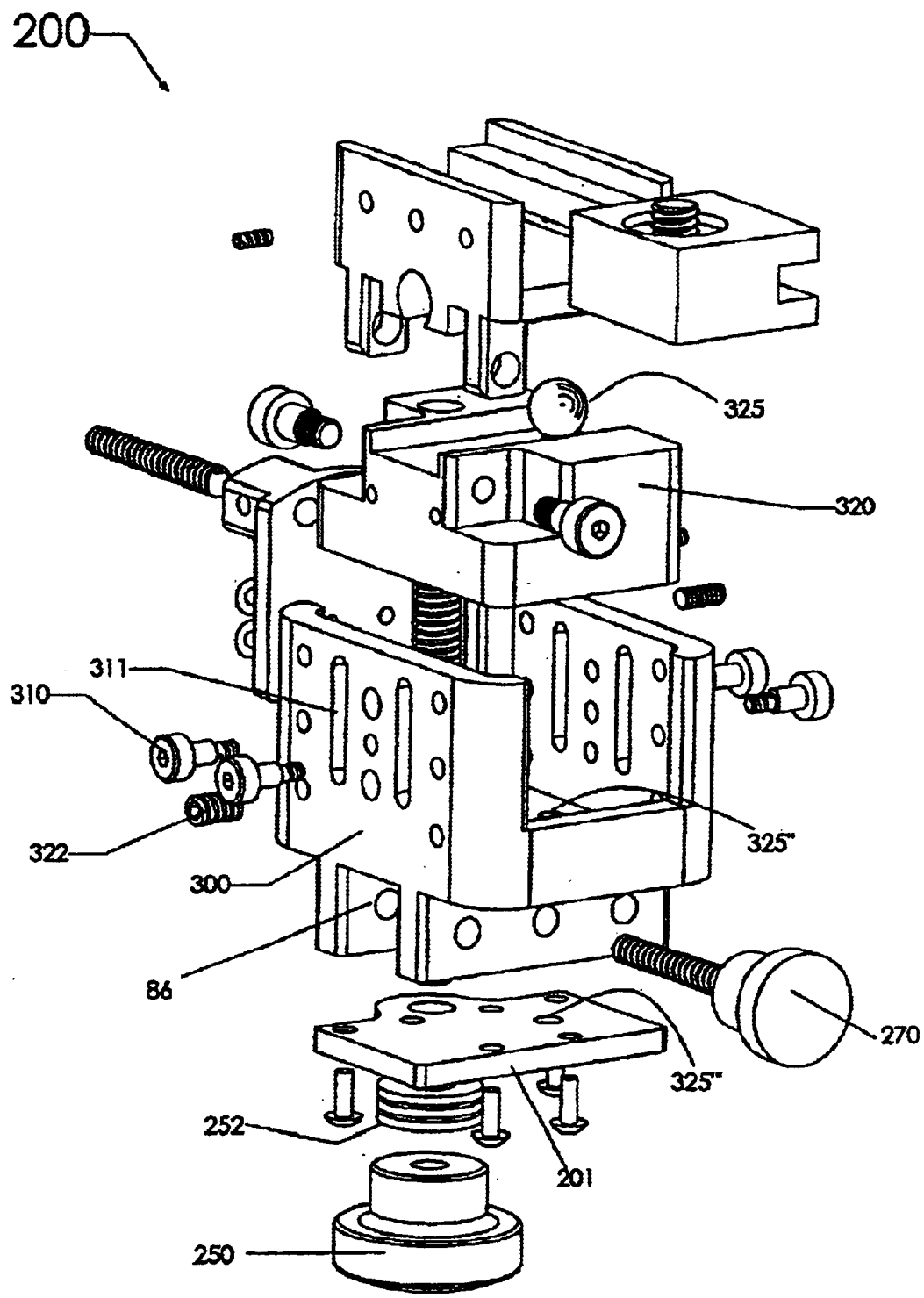
FIG. 2a is a closer right posterior exploded view of the apparatus without camera attached.

Tiltable platform 290, which supports the camera platform 260, may be pivoted about the axis formed by shoulder bolts 321 which engage the tiltable platform and connect it to the base platform 320. As more readily shown in FIG. 2a (which is another posterior view as seen from the opposite side of FIG. 2), a ball-headed screw 325, which slideably engages in the semi-circular profile 325' on the lower side of tiltable platform 290, may be screwed up and down in base platform 320 from below with an Allen wrench which fits the cap head screw below the ball. Referring collectively to FIGS. 1–2a, rail 100 provides a slit or groove 81 through which an Allen wrench may be inserted to screwably adjust the ball-headed screw 325 through hole 325''' in the base plate 201 and hole 325'' in platform 300.

Figure 3:
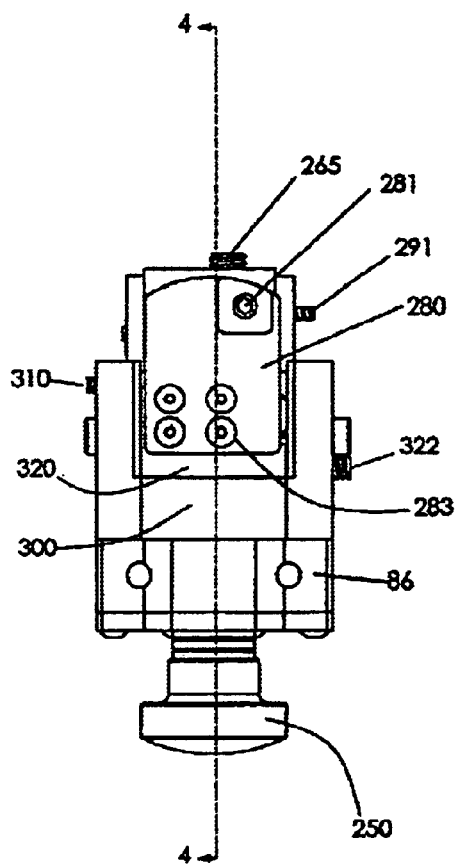
FIG. 3 is a right side plan view of the platform assembly without mounted camera.

FIG. 3 is a left side plan view of the camera platform showing the threads 265 of the bolt which engage the camera (not shown in this view). FIG. 3 further shows the spaced relationship of the end plate 280 affixed to platform 320 by screws 283. It further shows the set screw 281 which fixes the lateral movement of the camera carrier 260 which is then fixed by set screw 291. Once the proper perpendicular movement brings the camera lens into axial alignment with the telescope eyepiece 29 through the movement of knob 250, set screws 322 may be moved into engagement of platform 320 to fix the perpendicular movement of the system.

Figure 4:
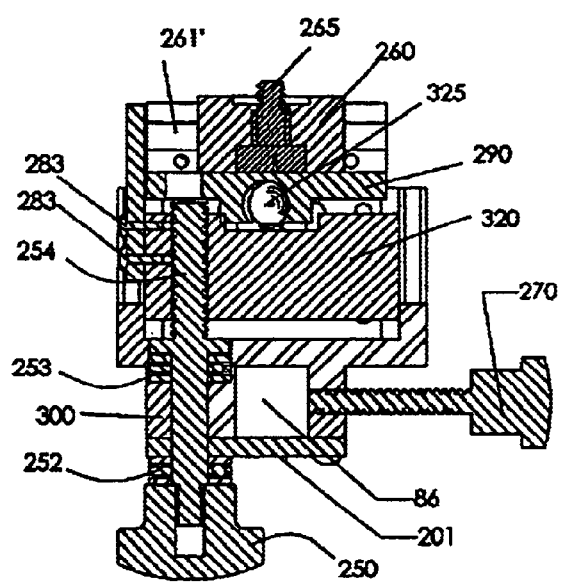
FIG. 4 is a cross-sectional view of the platform assembly through the line 4—4 of FIG. 3.

FIG. 4 is a posterior cross sectional view of the platform 200 through the line 4—4 of FIG. 3. Camera carrier 260 and mounting screw 265' slideably engage T-edge or rail 261' and are tiltably supported on carrier 290. Knob 270 moves a compressive screw into space or groove 86 to fix the platform 200 in spaced relationship with the optical axis of the telescope and camera. As previously noted, knob 250 moves platform or base 320 in a plane perpenicular with the said optical axis of the telescope and camera to align the their respective optical center lines. Carrier or platform 320 is allowed to smoothly move in the body 200 by bearings 252 and 253 and screws 254 in the platform.

Figures 5, 6:
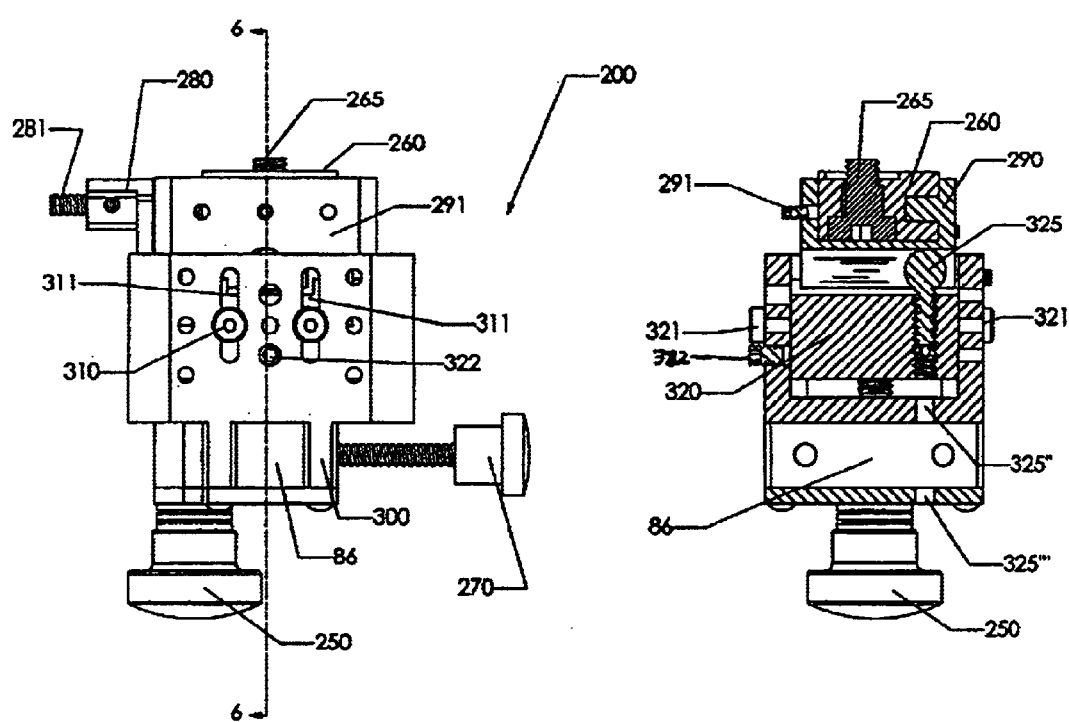
FIG. 5 is a posteriof plan view of the platform assembly without mounted camera.
FIG. 6 is a cross section view of the platform assembly through the line 6—6 of FIG. 5.
Figure 6A:
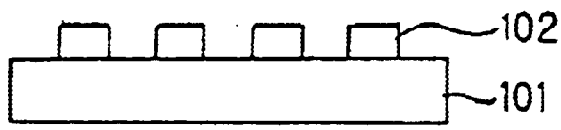
Figure 6B:
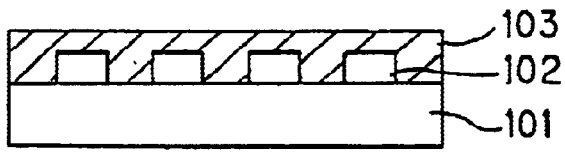
Figure 6C:
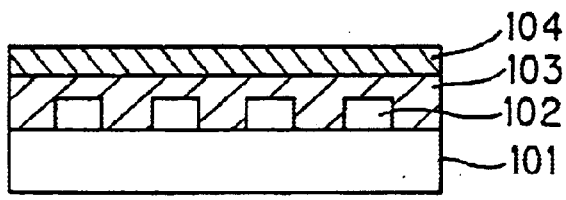
Figure 6D:
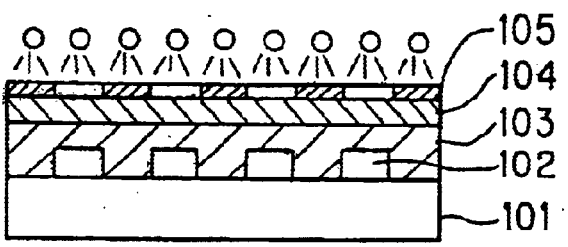
Figure 6E:
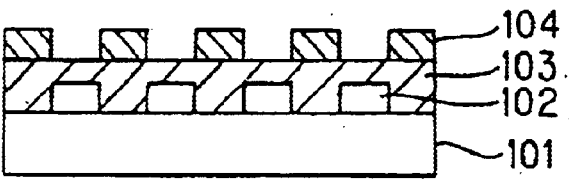
Figure 6F:
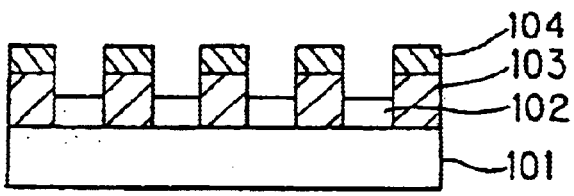
Figure 6G:
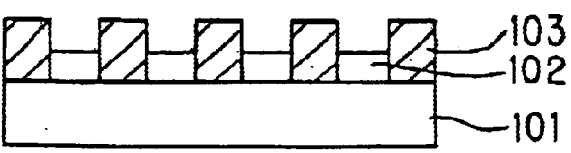

FIG. 5 is a posterior plan view of the camera adapter platform 200 showing the spaced relationship of many of the parts previously discussed as well as the slots 311 through which socket head shoulder screws 310 attach to the platform 320 to provide a limited range of movement in part 300. This limited range of travel is necessary to prevent part 320 from detaching from the engagement screw 254 that in turn screw 254 is attached to knob 250. Set screw 322, upon engagement, clamps platform 320 fixing the said platform in the Z-axis context of FIG. 1. FIG. 5 also again shows the knobs 270 and 250 that are used to lock the platform 200 on the rail and move the interior platform 320, respectively.

FIG. 6 is a cross sectional view of the platform 200 through the line 6—6 of FIG. 5 which further discloses the spaced relation of the parts of the platform. Each of the parts is consistently numbered throughout the drawings. This figure more clearly demonstrates the relationship between the adjustment passages 325' and 325" which permit the manipulation of the ball headed screw 325 to tilt platform 290 to achieve a high degree of linear alignment of the camera lens with the optical axis of the telescope system to which it is attached. As previously noted, the rail 100 after insertion in slot 86 as shown in FIG. 1 is provided with slot 81 which allows an Allen wrench to be inserted into the body while the camera is in place to adjust the tilt of the camera platform.

FIG. 7 is a right posterior perspective view of the complete assembly showing the platform 200 mounting a single lens reflex camera 31 on rail 100 in spaced relationship with telescope lens 29 mounted a a Schmidt-Cassegrain telescope SCT. As may be readily appreciated, there may be a substantial gap between the lens 29 of the SCT and the lens of the camera 31. Accordingly, a further feature of this invention is the addition of a lens hood.

FIG. 8 shows hood 2 fabricated from a water resistant fabric incorporating a flexible wire frame on at least two edges to hold the fabric around the two lens system. The fabric may be made from any lightweight and opaque material. The hood could also be fabricated from lightweight elastomeric material. The hood 2 may be further connected or attached to the rail 10 by the flexible wire frame; or, alternatively, may be attached after alignment without attachment to the rail. FIG. 9 shows the hood 2 attached to rail 100 from the opposite side of the hood system shown in FIG. 8. Any method of attachment may be used such as the wrapping of the metal wire around the frame 100 such as shown in 2', or by other well-known means of attachment.

As previously noted, FIG. 10 shows the flexibility of the mounting system of the present invention. A videocamera VC is mounted in the manner previously described for mounting the single lens reflex camera to the top of the platform 200 and on rail 100 affixed to yoke 30, and thereafter adjusted to put videocamera into axial alignment with the optical axis of the telescope. Similarly, a charge coupled device or digital videocamera could likewise by attached in the same manner to use the mounting system without departing from the spirit of the invention disclosed herein. Furthermore, larger optical devices could be mounted in a similar fashion using an larger adjustable platform adapted by the addition of an additional post to secure the larger instrument to the platform without departing from the scope or intent of the specification.

The foregoing embodiments are presented by way of example only; the scope of the present invention is to be limited only by the following claims.

What is claimed is:

1. A mounting apparatus for a telescope, comprising:
   a mount for attachment to the telescope, the mount providing a non-circular groove;
   a non-circular rail insertable in the groove of the mount;
   an adjustable platform providing a second non-circular groove, adaptable for mounting a photonic receptor device axially parallel to a longitudinal optical axis of the telescope on said rail;
   whereby the photonic device is configured to be mounted and adjusted to align the photonic device on the longitudinal optical axis of the telescope; and
   an opaque hood to cover a space formed between an eyepiece of the telescope and the photonic receptor device following alignment.

2. The mounting apparatus of claim 1 wherein the mount for attachment to a telescope comprises:
   a rear cell adapter providing a throat for engagement of an eyepiece of the telescope;
   a yoke compressively fitted around said rear cell adapter; and,
   a non-circular groove on said yoke for engagement with a mounting rail.

3. The mounting apparatus of claim 1 wherein the non-circular rail comprises:
   a lightweight elongate square member providing a groove therethrough whereby a wrench is configured to be inserted through the rail; and,
   a space for insertion of a locking device on each end of the non-circular rail whereby the rail may not be inadvertently removed from the groove of the mount.

4. The mounting apparatus of claim 1 wherein the adjustable platform comprises:
   a second groove adaptable for insertion and retention of the rail;
   a means for movement of photonic receptor in each of the axes perpendicular to the longitudinal optical axis of the telescope; and,
   a means for tilting the photonic receptor in the longitudinal optical axis of the telescope.

5. An apparatus to record distant images, the apparatus comprising:
   a telescope, said telescope having an eyepiece, said eyepiece defining a first optical axis;
   a mount for attachment to said telescope adjacent said eyepiece, the mount providing a yoke;
   said yoke configured to receive a proximal end of a non-circular rail, said non-circular rail defining a rail axis;
   an adjustable platform configured to mount a camera, the camera having a second optical axis;
   said adjustable platform configured to be mounted upon a distal end of said non-circular rail; and
   said adjustable platform is configured such that said second optical axis is axially parallel to said first optical axis and a distance between said eyepiece and said camera is adjustable along said rail axis.

6. The apparatus of claim 5 wherein said rail axis is substantially parallel to said first optical axis.

7. The apparatus of claim 5 wherein said distance between said eyepiece and said camera is covered by an opaque hood.

8. The apparatus of claim 5 wherein said non-circular rail includes a threaded hole and a corresponding set screw to prevent accidental removal of said non-circular rail from said yoke.

9. The apparatus of claim 5 wherein said non-circular rail includes a threaded hole and a corresponding set screw to prevent accidental movement of said non-circular rail relative to said camera.

10. The apparatus of claim 5 wherein said adjustable platform is configured to allow said camera to be manipulated in a plane perpendicular to said second optical axis.

11. The apparatus of claim 5 wherein said adjustable platform is configured to allow said camera to be tilted in said second optical axis.

12. The apparatus of claim 5 wherein said camera is a still camera.

13. The apparatus of claim 5 wherein said camera is a motion camera.

14. The apparatus of claim 5 wherein said camera is a film camera.

15. The apparatus of claim 5 wherein said camera is a CCD camera.

16. The apparatus of claim 5 wherein said telescope is a Schmidt-Cassegrain telescope.

17. An apparatus to mount to a telescope, the apparatus comprising:
- a mount for attachment to the telescope wherein the telescope defines a first optical axis, the mount configured to receive a rail, said rail defining a rail axis;
- an adjustable platform configured to mount a camera, the camera having a second optical axis;
- said adjustable platform configured to be mounted upon said rail; and
- said adjustable platform is configured such that said second optical axis is substantially axially parallel to said first optical axis and a distance between an eyepiece and said camera is adjustable along said rail axis.

18. The apparatus of claim 17 wherein said adjustable platform is configured to allow said camera to be manipulated in a plane perpendicular to said second optical axis.

19. The apparatus of claim 17 wherein said adjustable platform is configured to allow said camera to be tilted in said second optical axis.

* * * * *